Figure 1:
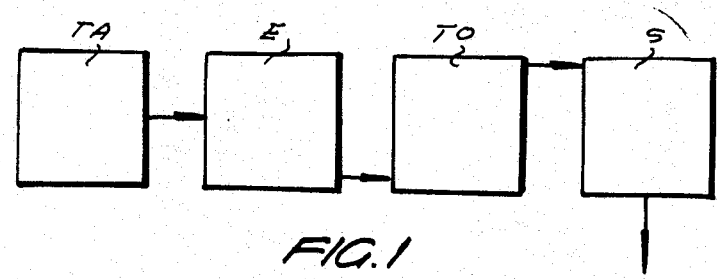

United States Patent
Fera

[11] 3,868,199
[45] Feb. 25, 1975

[54] APPARATUS FOR PRODUCING POWDERED PARAFFIN

[76] Inventor: Jose Fera, Parana 791, Buenos Aires, Argentina

[22] Filed: Aug. 8, 1973

[21] Appl. No.: 386,665

Related U.S. Application Data

[62] Division of Ser. No. 257,111, May 26, 1972.

[30] Foreign Application Priority Data
June 4, 1971  Argentina ............................ 235975
June 4, 1971  Argentina ............................ 235976

[52] U.S. Cl. ................................. 425/10, 264/14
[51] Int. Cl. .......................................... B22d 23/08
[58] Field of Search ............... 425/6, 10; 264/14, 15

[56] References Cited
UNITED STATES PATENTS 1,837,869  12/1931  Jewett et al. ..................... 425/10 X
2,714,224  8/1955  Schaub .............................. 425/10
3,651,182  3/1972  Rosenthal ....................... 264/14 X FOREIGN PATENTS OR APPLICATIONS
417,449  10/1934  Great Britain ....................... 425/6

Primary Examiner—Robert L. Spicer, Jr.
Attorney, Agent, or Firm—Ladas, Parry, Von Gehr, Goldsmith & Deschamps

[57] ABSTRACT

This invention relates to a process for producing powdered paraffin, characterized by comprising the steps of heating the liquid paraffin to a temperature between 50°C and 70°C, spraying the liquid paraffin into a high velocity flow of cold air, maintaining the mixture until the paraffin solidifies, and separating the powdered paraffin from the air, discharging the paraffin for further operations.

2 Claims, 4 Drawing Figures

PATENTED FEB 25 1975　　　　　　　　　　　　3,868,199

APPARATUS FOR PRODUCING POWDERED PARAFFIN

This is a division of application Ser. No. 257,111 filed May 26, 1972.

This invention relates to a process and an apparatus for producing powdered paraffin, which process comprises an ordered sequence of steps providing a powdery product composed of spherical particles having diameters of between 0.08 mm and 0.018 mm.

The process of this invention consists in an ordered sequence of steps that may be carried out in a simple arrangement requiring a heating fluid and air for spraying the product.

The apparatus for carrying out the process comprises a tower for spraying and cooling liquid solidifiable products, which provides a device for obtaining a mixture of inert cooling gas and solid powdered product.

Describing first of all the process of this invention, the same comprises the steps of heating the paraffin to a temperature between 50°C and 70°C; forcing the paraffin at this temperature through sprayers at a pressure that may vary between 7 and 21 kg/cm$^2$; entraining the paraffin from the sprayers in a high velocity flow of cold air and thus cooling the product down to its solidification temperature, obtaining powdered paraffin entrained in an air flow whose velocity increases until the mixture of powdered paraffin and air is discharged into a separator; and collecting the powdered paraffin ready to be used.

Preferably the liquid paraffin sprayed from the sprayers is entrained in a tower having a vertical axis, into which air is blown from below, where the sprayers are, at a rate of 9 to 12 m$^3$/hour for each kilogram of powdered paraffin obtained, as will be described later on.

On the other hand, the velocity of the cold air flow in which the liquid paraffin issuing from the sprayers is entrained varies between about 20 and 35 metres per second, which variation is preferably obtained by varying the cross section of the spraying tower.

The end product, obtained by the described process, when examined under the microscope, is a powder of spherical particles whose sizes vary slightly.

An analysis of the particle sizes of the powdered paraffin obtained by the process of this invention shows the following distribution of sizes:

| | |
|---|---|
| over 0.080 mm | from 2% to 5% |
| between 0.080 and 0.045 mm | from 10% to 13% |
| between 0.045 and 0.018 mm | from 25% to 30% |
| under 0.018 mm | up to 100% |

The product thus obtained is easy to handle in packaging, transport and discharge operations as well as in its subsequent processing.

The powdery structure as well as the distribution of particle sizes of the product obtained by the process of this invention are new, and the process is completely different from the methods known until now.

Figures 2, 3, 4:
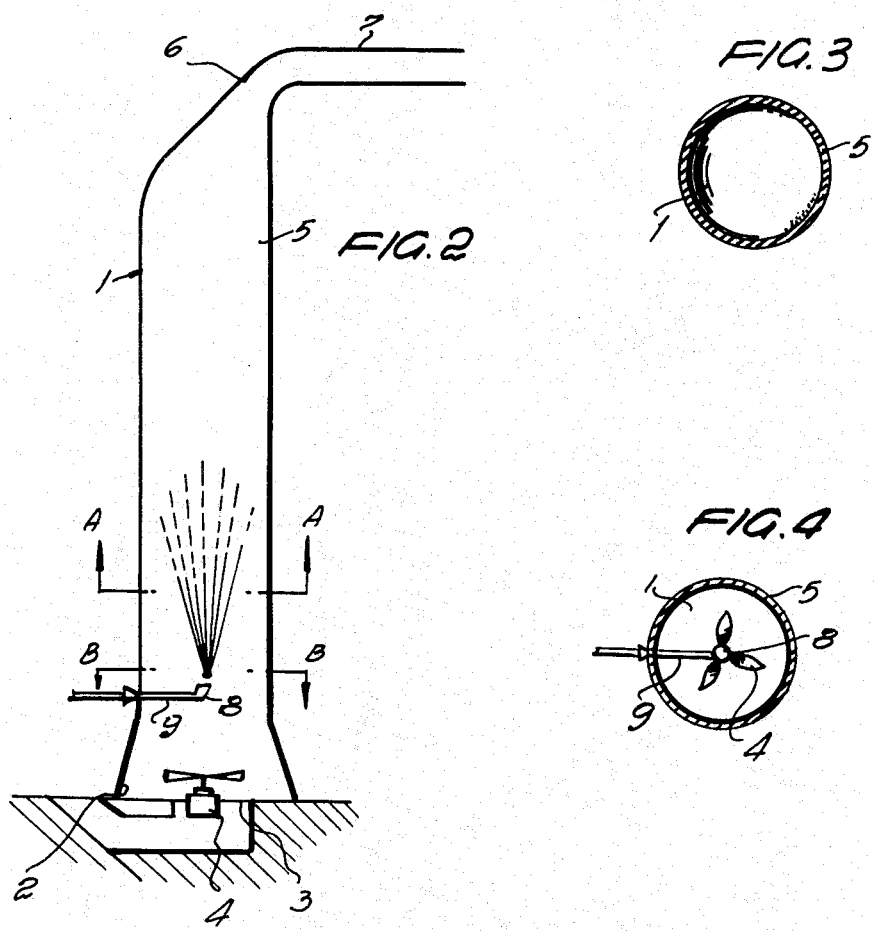

The annexed drawings show a preferred apparatus for carrying out the process of this invention; in the said drawings:

FIG. 1 is a diagrammatic view of the apparatus;
FIG. 2 is a longitudinal section through a novel spraying tower according to the invention;
FIG. 3 is a section along the line A—A of FIG. 2;
FIG. 4 is a section along the line B—B of FIG. 1.

Referring now to FIG. 1, an embodiment of the comprises providing a storage tank TA for the paraffin; the paraffin is kept liquid at a temperature between 65°C and 85°C by means of a heating vapor coil.

The said tank is connected to a cooler E where the liquid paraffin is cooled down to a temperature between 52°C and 69°C. Preferably the cooler is a cold water coil, and a suitable conduit for recirculating the liquid paraffin to the tank is interposed between the latter and the cooler.

The paraffin is pumped by a gear pump to the cooling and spraying tower TO at a pressure that may vary between 7 and 21 kg/cm$^2$. In this tower the liquid paraffin is sprayed and simultaneously cooled down from the temperature it has when entering the sprayer, i.e. between 50°C and 66°C, to the temperature it has when leaving the sprayer, i.e. between 40°C and 60°C. The liquid sprayed paraffin is carried by air flowing through the cooling tower, its velocity increasing preferably to 85–110 km/hour along a path of approximately 7 to 12 metres.

Once the solidified powdered paraffin is suspended in the air flow the mixture is introduced into a centrifugal separator, preferably a cyclone, the powder being discharged for packaging or subsequent processing.

Referring now to FIGS. 2 to 4, these show a novel cooling tower according to the invention, consisting of a shell whose overall height is the same as the length of the path necessary for solidifying in powdery form the material being treated, the said shell having three sections.

The first of these sections, indicated by the reference number 2, is frusto-conical and its height is 12% of the overall height, its coning angle being about 77°. The bigger diameter of this frusto-conical portion corresponds to the opening 3 where the blower 4 which impels the inert carrier gas is situated.

The second portion 5 is cylindrical, its diameter being the same as the smaller diameter of the first section, and it extends along 65% of the overall height; the second portion 5 continues in a third nose-shaped portion 6 whose height is about 23% of the overall height of the tower.

An outlet conduit 7 completes the assembly and serves to connect the tower, e.g., with the cyclone S where the powder carried by the inert gas blown in by the blower 4 is separated.

The sprayers 8 are situated above the blower 4 and connected by a conduit 9 to an impeller of the liquid product to be sprayed, which comes from the cooler F. The said sprayers 8 and the flow of inert gas provided by the blower 4 produce a mixture of liquid droplets and gas, and as this mixture moves through the tower it cools down and the droplets solidify. The increase in velocity in the portion 6 makes it possible to maintain the mixture and to introduce it into the cyclone S at a suitable rate.

What I claim is:

1. Apparatus for producing powdered paraffin wax, comprising a tower consisting of a first frusto-conical portion extending 10% to 15% of the overall height of the tower with its larger diameter at the base of the tower, a second cylindrical portion extending 60% to 70% of the height of the tower joined to the smaller diameter of the first portion, and a third nose-shaped portion extending the remaining height of the tower and connected to an outlet conduit, means for spraying liquid paraffin wax droplets into the lower end of the cylindrical portion and means in the frusto-conical portion for blowing inert cooling gas upwardly through the tower to produce a flow of powdered paraffin wax as solidified droplets.

2. Apparatus according to claim 1 including separating means connected to said outlet conduit for separating the powdered paraffin wax from the inert gas.

* * * * *